UNITED STATES PATENT OFFICE.

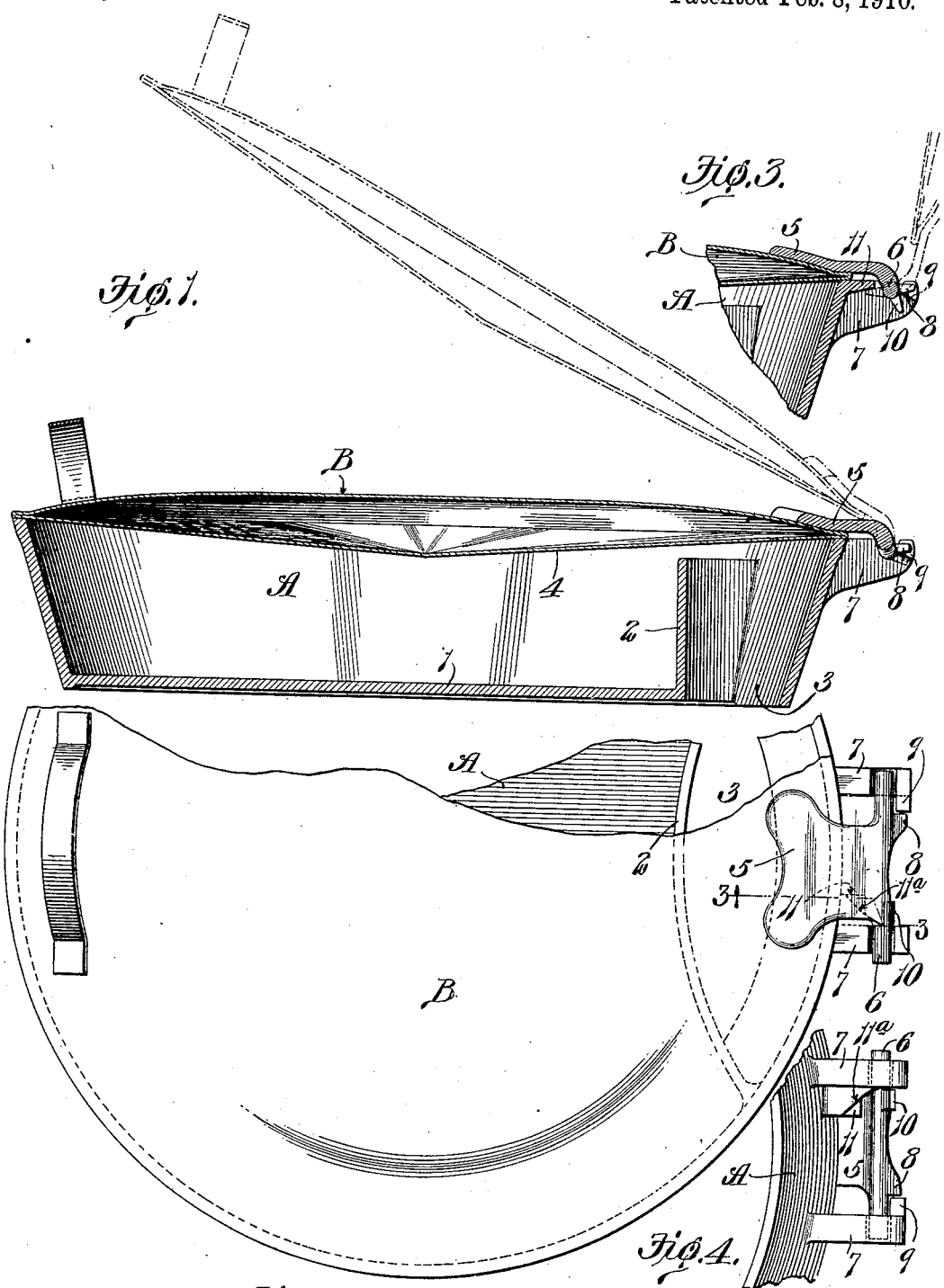

FREDERICK ANDREAS AND FRANK L. SCHAAB, OF ST. LOUIS, MISSOURI.

COOKING UTENSIL.

948,491.  Specification of Letters Patent.  Patented Feb. 8, 1910.

Application filed February 23, 1909. Serial No. 479,372.

*To all whom it may concern:*

Be it known that we, FREDERICK ANDREAS and FRANK L. SCHAAB, both citizens of the United States, residing at St. Louis, Missouri, have invented a certain new and useful Improvement in Cooking Utensils, of which the following is a full, clear, and exact description, such as will enable others skilled in the art to which it appertains to make and use the same.

This invention relates to cooking utensils.

One object of our invention is to provide a cooking utensil of novel construction that prevents the fumes, smoke, and steam from the food being cooked from escaping into the room in which the stove is located.

Another object is to provide a cooking utensil of the character above described which is so constructed that the vapor produced by the condensation of the steam in the utensil will not drop onto the top of the stove when the utensil is removed from the fire. And still another object of our invention is to provide a cooking utensil having a cover or lid that can be detached easily, and means for retaining said cover in a raised or elevated position.

Figure 1 of the drawings is a vertical sectional view of a cooking utensil constructed in accordance with our invention; Fig. 2 is a top plan view of said utensil, a portion of the cover being broken away to more clearly show the construction of the flue or passageway through which the fumes and smoke escape; Fig. 3 is a detail vertical sectional view taken on approximately the line 3—3 of Fig. 2; and Fig. 4 is a bottom plan view of the hinge members.

We have herein shown our invention embodied in a skillet or frying-pan but we wish it to be understood that our broad idea is not limited to this particular utensil and therefore wherever we have used the term "cooking utensil" we mean to include all cooking utensils such as are generally used on the top of a stove for frying, steaming, boiling, etc. The cooking utensil herein shown is intended to be used on a coal stove or wood stove but it could also be used on a gas stove provided with a special top for collecting the fumes and smoke that escape through the flue in the utensil as hereinafter described.

Referring to the drawings which illustrate the preferred form of our invention, A designates the body portion of a cooking utensil, and B designates a removable lid or cover for same. The bottom 1 of the receptacle A is provided with an opening or cut-out portion that is located adjacent its side wall, and said receptacle is also provided with an inner wall 2 that projects upwardly from the inner edge of said opening so as to prevent the contents of the receptacle from escaping through said opening. This inner wall 2 extends the full length of the opening in the bottom 1 and its ends are permanently connected to the side wall of the receptacle so as to form a vertical flue or passageway 3. The upper edge of the inner wall 2 terminates a slight distance below the cover B and as the lower end of the flue 3 is open, the fumes, smoke and steam from the food being cooked can escape through said flue into the smoke-pipe of the stove on which the utensil is used.

The under side 4 of the lid or cover B is preferably so constructed that any vapor which collects on the same will flow inwardly toward the center of the receptacle A and away from the flue 3. The object of constructing the cover in this manner is to prevent the vapor which collects on the under side of the cover from dripping onto the top of the stove through the flue 3 whenever the utensil is removed from the fire. That is to say, if some means were not provided for causing the vapor on the under side of the cover to drain or flow away from that portion of the cover which extends over the flue 3, said vapor would drip from the cover through the flue onto the stove when the utensil was removed from the fire. By providing the under side of the cover with a portion that inclines inwardly from the outer edge of the receptacle toward the center of the receptacle it is impossible for vapor to collect and drip off of that portion of the cover which extends over the flue, for the vapor will naturally drain to the lowest point of the cover before it drips off of same. The under side 4 of the cover herein shown is approximately of inverted conical shape but if desired the cover could be provided with an inclined portion that only extended over the flue or passageway 3.

The other feature of our invention that we believe is novel is the means for retaining the cover of the utensil in a raised or elevated position, and while we have herein shown this feature embodied in a utensil provided with a flue or passageway for permitting the fumes and smoke to escape, we wish it to be understood that the particular construction of the body portion of the utensil is immaterial so far as this feature is concerned.

The cover B is provided with a hinge member 5 that has a pintle 6 which rests freely in open sockets or bearings formed in a stationary hinge member 7 that projects laterally from the side wall of the receptacle A so as to enable said cover to be removed or disconnected from the utensil by simply lifting it upwardly. The pintle 6 rocks in the open bearings or sockets in the stationary member 7 of the hinge when the cover is raised or tilted slightly, as shown in dotted lines in Fig. 1, and when said cover has reached a certain position it is shifted laterally slightly so as to cause a lug 8 on the pintle to pass under a lug 9 on the stationary hinge member 7 and thus retain the cover in a partially elevated position, as shown in broken lines in Fig. 1. The coöperating lugs 8 and 9 on the hinge members thus retain the cover in a partially raised position and when the cover is fully raised, as shown in broken lines in Fig. 3, a lug 10 on the pintle engages a coöperating lug 11 on the stationary hinge member 7 so as to prevent the cover from swinging rearwardly away from the receptacle. This lug 11 has an inclined face 11ª, as shown in full lines in Fig. 4, and in broken lines in Fig. 2, and when the cover is swung upwardly the lug 10 on the pintle engages said inclined face 11ª and thus causes the cover to automatically shift laterally so as to bring the lug 8 on the pintle under the lug 9 on the stationary hinge member.

From the foregoing it will be seen that the cover is shifted automatically into its locked position when it is swung upwardly so that it is not necessary for the operator to shift the cover after it has been raised to bring the lug 8 under the lug 9.

The lid or cover B can be completely disconnected from the receptacle A by simply lifting the hinge member on the cover out of the open bearings in the stationary hinge member, thus enabling the utensil to be cleaned easily, and as means is provided for retaining the cover in a raised position it is not necessary for the cook to use one hand for this purpose.

A cooking utensil of the construction above described absolutely prevents the fumes and smoke from the food being cooked from escaping into the room for the flue 3 establishes communication between the interior of the utensil and the smoke-pipe of the stove on which the utensil rests. Furthermore, when the utensil is removed from the fire and set on the top of the stove, water will not drip onto the stove through the flue 3 for the lid of the utensil is so constructed that the water on the under side of the cover drains to the center of the receptacle.

Having thus described our invention, what we claim as new and desire to secure by Letters Patent is:

1. A cooking utensil, comprising a receptacle, a cover detachably hinged thereto and shiftably mounted thereon, means whereby said cover is caused to gradually shift laterally when it is raised, and means for holding said cover in a partially raised position, the means last referred to being brought into operative relation by the lateral movement of the cover.

2. A cooking utensil, comprising a receptacle, a cover detachably hinged thereto, a stationary inclined face on said receptacle adapted to coöperate with a lug on said cover to shift said cover laterally when the same is raised, and means comprising a projection on said cover and a stationary stop on said receptacle which coöperate with each other when said cover is shifted laterally to hold said cover in a position intermediate its horizontal and vertical positions.

3. In a cooking receptacle, a cover for said receptacle provided with a pintle, ears extending outwardly from said receptacle and having recesses in their upper edges for the reception of said pintle, means on said pintle coöperating with means on said ears for shifting said cover laterally and for maintaining said cover in a fully raised position, and coöperating means on said pintle and ears for maintaining said cover in a partially raised position.

4. In a cooking utensil, the combination of a receptacle, integral projections or ears extending outwardly therefrom and provided on their upper edges with approximately semi-circular bearings, a cover for said receptacle provided with a pintle adapted to rotate in said bearings, projections 8 and 10 on said pintle, a cam face 11ª on one of said ears 7 adapted to coöperate with the projection 10 to shift the pintle laterally when said cover is raised, a stop 11 adjacent said cam face to coöperate with the projection 10 to retain the cover in its fully raised position, and a lug 9 on the other of said ears 7 that coöperates with the projection 8 to retain the cover in a partially raised position.

5. A cooking utensil, comprising a receptacle, a swinging cover for said receptacle, coöperating hinge members on said receptacle and cover, a device on one of said hinge members that is adapted to engage a device on the other hinge member to retain the cover in a raised position, and a projection on one of said hinge members that engages an inclined face on the other hinge member when the cover is swung upwardly, so as to cause said retaining devices to engage each other.

In testimony whereof, we hereunto affix our signatures, in the presence of two witnesses, this 10th day of February, 1909.

FREDERICK ANDREAS.
FRANK L. SCHAAB.

Witnesses:
WELLS L. CHURCH,
GEORGE BAKEWELL.